Patented June 20, 1950

2,512,572

UNITED STATES PATENT OFFICE 2,512,572

SUBSTITUTED PTERIDINES AND METHOD OF PREPARING SAME

James M. Smith, Jr., North Plainfield, and Donna B. Cosulich, Bound Brook, N. J., assignors to American Cyanamid Company, New York, N. Y., a corporation of Maine No Drawing. Application October 22, 1947, Serial No. 781,492

15 Claims. (Cl. 260—251)

This invention relates to new organic compounds and to processes of preparing the same.

Recently pteroic acid and some of its amino acid amides have been synthesized and found to possess biological activity. Some of these, particularly the glutamic acid amides of pteroic acid, such as N-[4-{-[(2-amino-4-hydroxy-6-pyrimido [4,5-b] pyrazyl) methyl] amino}benzoyl] glutamic acid, have been found effective in stimulating the formation of hemoglobin and useful in the treatment of macrocytic anemia, sprue and other diseases. This latter compound is also commonly known as folic acid and is now widely employed in medicine. A process of preparing such compounds is described in the copending application of Coy W. Waller and John H. Mowat, Serial Number 606,704, filed July 23, 1945, now Patent Number 2,500,296.

We have found that certain vicinal diamino pyrimidines may be reacted with an alpha, beta-dihalopropionaldehyde and secondary amines of the type to be described hereinafter to yield new compounds. Although some of these are related to folic acid structurally, they possess entirely different physiological activity. Most of the new compounds of the present invention antagonize folic acid in the animal body and, accordingly, are of very great potential importance in medicine in an experimental capacity and possibly in the treatment of disease. The new pterins of the present invention and the process by which they may be prepared are shown by the equation which follows. In the general formulae X and Y are hydrogen, hydroxy, sulfhydryl, alkyl, halo, amino or other radicals, R is an alkyl or substituted alkyl radical, and R' is an aromatic radical:

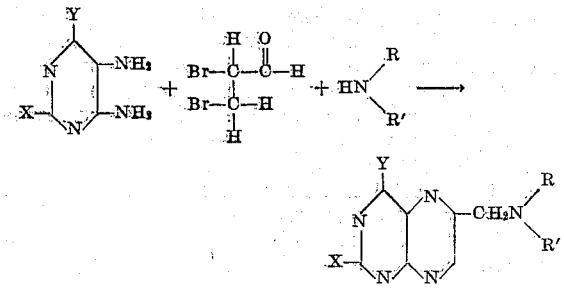

The reaction may be made to take place by simultaneously mixing the three intermediates together, preferably in the presence of water which serves as solvent for the intermediates and/or the reaction product. Suitable solvents for the reaction also include ethyl alcohol, acetone, benzene, carbon tetrachloride, chloroform, acetic acid and other organic liquids and mixtures thereof with each other or water. Some reaction may take place, however, by merely mixing the necessary reactants together and heating the mixture.

The reaction may take place over a wide range of temperatures of from about 0° C. up to about 100° C. or even higher. Likewise, the reaction will take place over a wide range of pH conditions, best results being obtained on the acid side at a pH within the range of about 1.5 to 6.

As noted above, the reaction may be caused to take place by mixing all three of the intermediates simultaneously and after reaction thereof recovering the resulting product. It may be desirable, however, in some cases to first react the 4,5-diaminopyrimidine with the dihalopropionaldehyde before adding the secondary aromatic amine to the reaction mixture or, on the other hand, to first react the secondary aromatic amine with the dihalopropionaldehyde and then react the mixture with the vicinal diamine.

The 4,5-diaminopyrimidines may be added to the reaction mixture in the form of the free base or as one of the acid salts which are usually more readily available and easier to handle than the free base. It should be noted, however, that insofar as the reaction is concerned the effective reactant is probably the ionized form of the diamine. Tautomeric forms of some of the diamines are possible, and such are not excluded from the scope of the present invention.

The preparation of many of the 4,5-vicinal diaminopyrimidines contemplated as intermediates in the process of the present invention has been described in the literature. These may be made by various processes including (1) nitrosating a suitable 4-aminopyrimidine and thereafter reducing the nitroso group to obtain the corresponding 4,5-diaminopyrimidine; (2) coupling a diazonium salt with a suitable 4-aminopyrimidine and thereafter reducing the azo group to an amino radical; and (3) nitrating a 4-aminopyrimidine having desired substituents on the 2 and/or 6 positions and thereafter reducing the nitro group. By such reactions 4,5-diaminopyrimidines can be prepared having a variety of different types and kinds of radicals on the 2 and/or 6 positions on the pyrimidine ring. Such radicals include the amino, hydroxy, sulfhydryl, alkyl, halo and others. Representative examples of the use of such pyrimidines are illustrated hereinafter.

The dihalopropionaldehydes that may be used in the process include alpha, beta-dibromopropionaldehyde; alpha, beta-dichloropropionaldehyde and others. As will be appreciated by chemists in the art, the corresponding acetals may also be employed without modification of the essential conditions of the reaction.

As previously noted, the secondary amines that may be used in the process have the general formula HNRR′ in which R is an alkyl or substituted alkyl radical and R′ is an aromatic radical. The symbol R may represent such alkyl radicals as methyl, ethyl, propyl, butyl, etc., and substituted alkyl radicals such as benzyl, —CH$_2$COOH, and the salts and esters thereof, phenacyl and others. Most of these are represented in the specific examples which follow.

The preferred aromatic radicals represented by the group R′ include benzoic acid and its salts, esters and amides. Particularly useful are the amides of amino acids such as glutamic, aspartic, glycine, leucine, serine, phenylalanine, cysteine, isovaline and others. Amides of amino acids having a peptide linkage such as glutamylglutamic acid and glutamylglutamylglutamic acid are also included within the scope of the present invention. The amino acid portion of the radical represented by R′ may be natural or synthetic and may be in any of the d, l, or d,l forms. Free carboxyl groups of these amides may be esterified or neutralized or converted into an amide without interfering with the essential reaction. The use of secondary amines in which the group R′ represents a benzoic acid amide of amino acid is shown in several of the specific examples. Obviously, others may be employed in the same reaction without material modification of the conditions of the reaction. Although the reaction is not greatly affected by the nature of the group R′ the biological activity of the resulting products is radically affected by the substituent.

It might be expected upon consideration of the reactants used in the process that the final product would be a dihydropterin. As shown, however, the resulting product has two less hydrogen atoms than expected, the product having a fused aromatic pyrimido-pyrazyl nucleus. The oxidation of the non-aromatic dihydro pyrimidopyrazyl nucleus to the aromatic form occurs by some obscure mechanism such as internal oxidation or disproportionation in that the aromatic form is obtained even under nitrogen. Better results are obtained in the process, however, when oxidizing agents are added to the reaction mixture. Suitable oxidation agents are those having an oxidation-reduction potential of about −0.49 to −1.42 volts. Among these may be mentioned iodine, potassium bromate, chlorine, benzoquinone, manganese dioxide, sodium dichromate, ferric chloride, and still others. The use of some of these is illustrated in the specific examples.

The new compounds of the present invention may also be prepared by a process analogous to that described in the co-pending application of Martin E. Hultquist and Paul F. Dreisbach, Serial No. 701,082, filed October 4, 1946, now Patent Number 2,443,165. In this modification which is illustrated in some of the specific examples 2,4,5-tetraaminopyrimidine is reacted with a secondary aromatic amine and a 1,1-dihalo-3-halopropanone-2. In general, the conditions described therein may be used to prepare the new compounds of the present invention.

The process and representative compounds of the invention will now be disclosed in detail in the following examples. It will be understood, of course, that other products using intermediates mentioned hereinbefore may be prepared by the same process, the only essential difference being in the selection of the particular secondary aromatic amine employed. All parts are by weight unless otherwise indicated.

Example I 21.4 grams (0.0834 mol) 2,4,5-triamino-6-hydroxypyrimidine sulfate monohydrate and 20.4 grams (0.0834 mol) barium chloride dihydrate are slurried in 585 cc. water at 60° C. for 10 minutes. After cooling to 40° C., 12.6 grams (0.034 mol) p-methylaminobenzoic acid are added, and the pH of the mixture adjusted to 3–4. Simultaneously 36.6 grams (0.0834 mol) of a solution of 2,3-dibromopropionaldehyde in acetic acid, a solution of 10.4 grams (0.0417 mol) iodine and 20.8 grams potassium iodide in 67 cc. water, and 50% caustic are added over a 30 minute period. The mixture is kept at 40° C. and pH 3–4. The crude material is isolated by filtration with a filter aid, such as Hyflo. This crude material reverses the biological activity of pteroylglutamic acid.

To purify the crude product obtained above 12.6 grams of the crude 4-[N-(2-amino-4-hydroxypyrimido [4,5-b] pyrazyl-6-methyl) N-methylamino] benzoic acid, 9 grams lime, and 1750 cc. water are heated at 60° C. for 40 minutes. After addition of 25 grams Hyflo, the mixture is filtered and the cake washed with 750 cc. water at 60° C. To the filtrate is added 25 grams Hyflo and a 10% solution of zinc chloride to pH 10 to 11. The solids are filtered off and to the filtrate at 80° C. are added 25 grams Hyflo and a 20% zinc chloride solution to pH 6.99. The zinc salt is isolated by filtration, dissolved in 2500 cc. water containing caustic at 80° C. and reprecipitated by addition of 20% zinc chloride to pH 6.99. This zinc salt reprecipitation was repeated 3 times more.

The final zinc salt cake is slurried in 875 cc. water containing 1.5 grams lime. After heating at 60° C. for 40 minutes the solids are removed by filtration and washed with 375 cc. water. The filtrate is treated with 25 grams Hyflo and 10% zinc chloride solution to pH 9.82. The filtered solution is added slowly to 100 cc. 30% acetic acid at 80° C. The yellow micro-crystalline material isolated is 80% pure.

Example II

A mixture of 3.85 grams 2,4,5-triamino-6-hydroxypyrimidine sulfate monohydrate and 3.66 grams barium chloride dihydrate in 70 cc. water was heated to 60° C. for 10 minutes. After cooling to 40° C. 0.825 gram p-ethylaminobenzoic acid is added and the pH adjusted to 3–4. Keeping the mixture at 40° C. 3 cc. of a solution of 2,3-dibromopropionaldehyde in acetic acid is added simultaneously with a solution of 6.25 grams iodine and 12.5 grams potassium iodide in 40 cc. water and with 50% caustic to maintain pH 3–4. The crude material is isolated with a filter aid. It shows antagonist activity against pteroylglutamic acid. Further purification may be brought about by the procedure described in Example I.

Example III

A mixture of 25.7 grams 2,4,5-triamino-6-hydroxypyrimidine sulfate monohydrate, 24.4 grams barium chloride dihydrate, and 700 cc. of water are heated at 60° C. for 10 minutes. After cooling to 40° C., 19.3 grams of p-butylaminobenzoic acid is added, and the pH of the mixture adjusted to 3-4. At 40° C. simultaneously are added a solution of 0.1 mol of 2,3-dibromopropionaldehyde in acetic acid, a solution of 12.8 grams iodine and 25 grams potassium iodide in 80 cc. water, and 50% caustic to maintain pH 3-4. The crude material isolated by filtration is purified by the procedure of Example I. The product, 4-[N-(2-amino-4-hydroxypyrimido [4,5-b] pyrazyl-6-methyl)-N-butylamino] benzoic acid, shows antagonist activity against pteroylglutamic acid.

Example IV

4-[N-(2-amino-4-hydroxypyrimido [4,5-b] pyrazyl-6-methyl)-N-benzylamino] benzoic acid is prepared as in Example III above except that 22.7 grams of p-benzylaminobenzoic acid is used instead of the butyl compound.

Example V

4-[N-(2,4-dihydroxypyrimido [4,5-b] pyrazyl-6-methyl)-N-methylamino] benzoylglutamic acid is prepared as described in Example III except that 14.2 grams 2,4-dihydroxy-5,6-diaminopyrimidine is used in place of the triaminopyrimidine.

Example VI 1.65 grams 2,4,5-triamino-6-hydroxypyrimidine sulfate, 1.58 grams barium chloride dihydrate and 70 cc. water are heated to 60° C. for 10 minutes and cooled to 40° C. 1.275 grams p-phenacylaminobenzoic acid are added and the pH adjusted to 3-4. At 40° C. are added simultaneously solutions of iodine in potassium iodide, 2,3-dibromopropionaldehyde, and caustic to maintain pH 3-4. The crude 4-[N-(2-amino-4-hydroxypyrimido [4,5-b] pyrazyl-6-methyl)-N-phenacylamino] benzoic acid which is isolated shows antagonist activity against pteroylglutamic acid.

Example VII

A mixture of 25.7 grams 2,4,5-triamino-6-hydroxypyrimidine sulfate monohydrate, 24.4 grams barium chloride dihydrate, and 700 cc. water are heated to 60° C. for 10 minutes. After cooling to 40° C. 32.4 grams disodium-p-methylaminobenzoylglutamic acid is added and the mixture adjusted to pH 3-4. Simultaneously and at 40° C. solutions of 21.6 grams of 2,3-dibromopropionaldehyde in acetic acid, 12.5 grams iodine and 25 grams potassium iodide in 100 cc. water, and caustic to maintain pH 3-4 are added. The crude 4-[N-(2-amino-4-hydroxypyrimido [4,5-b] pyrazyl-6-methyl)-N-methylamino] benzoylglutamic acid which is isolated has antagonist activity against pteroylglutamic acid.

One-half of the crude material prepared above is heated with 2 liters water and 9 grams lime to 60° C. for 40 minutes. After adding 25 grams Hyflo, filtering, and washing, the filtrate is treated with 25 grams Hyflo and a solution of 10% zinc chloride to pH 10.99 and filtered. The filtrate is heated to 80° C. and 20% zinc chloride solution added to pH 6.9. After filtering with 25 grams Hyflo, the cake is treated with 3 liters water and caustic to pH 11-12 at 80° C. for 10 minutes. At 80° C. 20% zinc chloride solution is added to pH 6.9. The zinc salt is filtered off hot and reprecipitated 6 times more as described.

The last zinc cake is treated with 1 liter water and 5 grams lime at 60° C. for 40 minutes. After filtering and washing the cake, 20 grams Hyflo and 10% zinc chloride solution are added to pH 10.81. The filtrate is added to 100 cc. of 30% acetic acid at 80° C. The solid obtained on cooling is filtered with 12.5 grams Hyflo. The washed cake is treated with 1 liter of water, 0.6 gram magnesium oxide and 1 gram charcoal at 80° C. for ½ hour. The hot filtrate is added to 100 cc. of 30% acetic acid. On cooling, the purified material was obtained. This showed antagonist activity against pteroylglutamic acid.

Example VIII

4-[N-(2-amino-4-hydroxypyrimido [4,5-b] pyrazyl-6-methyl)-N-phenacylamino] benzoylglutamic acid is prepared as described in Example II except that 1.925 grams p-phenacylaminobenzoylglutamic acid is used instead of p-ethylaminobenzoic acid. The crude material isolated shows antagonist activity against pteroylglutamic acid.

Example IX

A slurry of 12.9 grams 2,4,5-triamino-6-hydroxypyrimidine sulfate monohydrate and 12.2 grams barium chloride dihydrate in 350 cc. water is heated to 60° C. for 10 minutes, treated with 7.6 grams N-methylanthranilic acid, cooled to 40° C., and adjusted to pH 3-4. Then is begun the simultaneous addition of 5.4 grams dibromopropionaldehyde in 5.4 grams acetic acid, 6.25 grams iodine and 12.5 grams potassium iodide in 40 cc. water, and 5 N sodium hydroxide to maintain pH 3-4. After stirring 10 minutes and cooling to 20° C., the crude 2-[N-(2-amino-4-hydroxypyrimido-[4,5-b]pyrazyl-6-methyl)-N-methylamino] benzoic acid is isolated by filtration.

Example X

A slurry of 2.9 grams 2,4,5,6-tetraaminopyrimidine sulfate dihydrate and 2.4 grams barium chloride dihydrate in 70 cc. water is heated at 60° C. for 10 minutes, treated with 1.5 grams 4-methylaminobenzoic acid, cooled to 40° C., and adjusted to pH 3-4. Then over a 20 minute period are added simultaneously 2.16 grams dibromopropionaldehyde in 2.16 grams acetic acid, 1.25 grams iodine and 2.5 grams potassium iodide in 8 cc. water, and 5 N sodium hydroxide to maintain pH 3-4. After stirring 10 more minutes and cooling to 20° C., the crude 4-[N-(2,4-diaminopyrimido [4,5-b] pyrazyl-6-methyl)-N-methylamino] benzoic acid, isolated by filtration, is an antagonist to pteroylglutamic acid.

The above product is purified as in Example I except that the purification is run at twice the concentration because of the increased solubility of this compound. The antagonist properties are increased on purification.

Example XI

A slurry of 22.3 grams 4,5,6-triaminopyrimidine sulfate and 24.4 grams barium chloride dihydrate in 700 cc. water is heated at 60° C. for 10 minutes, treated with 15 grams p-methylaminobenzoic acid, cooled to 40° C., and adjusted to pH 3-4. Then over a 20 minute period are added simultaneously 21.6 grams dibromopropionaldehyde in 21.6 grams acetic acid, 12.5 grams iodine and 25 grams potassium iodide in 80 cc. water, and 5 N sodium hydroxide to maintain pH 3-4. After stirring 10 minutes more and cooling to 20° C., the crude 4-[N-(4-aminopyrimido [4,5-b] pyrazyl-6-methyl)-N-methylamino] benzoic acid is isolated by filtration.

Example XII

A mixture of 12.25 grams of ethyl chloroacetate and 33 grams of benzocaine is heated at 130° C. to 140° C. for 5 to 6 hours. On cooling, the mixture is slurried in ether and filtered. The filtrate is freed of ether by evaporation, and the residue is distilled at 8–11 mm. pressure. The distillate is dissolved in ether and extracted with hydrochloric acid. Evaporation of the washed and dried ether layer yields the crude ethyl-N-[4-ethoxyphenyl] glycinate.

8.8 grams of ethyl-N-[4-carbethoxyphenyl] glycinate is boiled three to four hours in 100 cc. of 5 N caustic soda. On diluting, cooling, and acidifying pure N[4-carboxyphenyl] glycine separates.

A mixture of 3.85 grams 2,4,5-triamino-6-hydroxypyrimidine sulfate monohydrate and 3.66 grams barium chloride dihydrate in 70 cc. water was heated to 60° C. for 10 minutes. After cooling to 40° C. 0.925 gram of N-(4-carboxyphenyl) glycine is added and the pH adjusted to 3–4. Keeping the mixture at 40° C. 3 cc. of a solution of 2,3-dibromopropionaldehyde in acetic acid is added simultaneously with a solution of 6.25 grams iodine and 12.5 grams potassium iodide in 40 cc. water and with 50% caustic to maintain pH 3–4. The crude 4-[N-(2-amino-4-hydroxypyrimido [4,5-b] pyrazyl-6-methyl)-N-carboxymethylamino] benzoic acid is isolated with a filter aid. It shows antagonist activity against pteroylglutamic acid.

Example XIII

A slurry of 26 grams 2,4,5,6-tetraaminopyrimidine dihydrate sulfate, 24 grams barium chloride dihydrate, and 15 grams of p-methylaminobenzoic acid in 700 cc. water is heated at 80° C. for five minutes, adjusted to pH 3, and treated with 59 grams 1,1,3-tribromoacetone. The mixture is heated at 80° C. for one hour, the pH being kept at 3 by addition of 50% caustic solution. After cooling to 10° C. the crude 4-[N-(2,4-diaminopyrimido [4,5-b] pyrazyl-6-methyl)-N-methylamino] benzoic acid is filtered, washed and dried.

A slurry of 30 grams of the crude material in 1 liter of water containing six grams lime is heated 40 minutes at 60° C. and filtered at this temperature. The cake is washed with water and hydrochloric acid added to the filtrate to adjust to pH 3.02. After cooling in the icebox overnight the precipitate is filtered off and slurried in 750 cc. water containing sodium hydroxide to give pH 11.0–11.6 at 80° C. When the material is all in solution, the mixture is adjusted to pH 7 while cooling to 20° C. After filtering, the pH is adjusted to 4–5 with hydrochloric acid, and the precipitated material filtered off. The cake is slurried in 500 cc. water and treated with magnesium oxide to obtain pH 8.9–9.3 at 80° C. 0.5 gram Darco is added, and the heating at 80° C. continued for 15 minutes more. After filtering, the filtrate is adjusted to pH 4–5 with dilute hydrochloric acid and cooled several hours at 10° C. The yellow-orange crystalline material which is isolated by filtration weighs about one gram.

Example XIV

A slurry of 15.8 grams 2-sulfhydryl-4-hydroxy-5,6-diaminopyrimidine and 15 grams p-methylaminobenzoic acid in 700 cc. water is heated at 40° C. and adjusted to pH 3–4. Over a 20 minute period are added simultaneously 21.6 grams dibromopropionaldehyde in 21.6 grams acetic acid, and 5 N sodium hydroxide to maintain pH 3–4. After stirring 10 minutes more and cooling to 20° C., the crude 4[N-(2-sulfhydryl-4-hydroxypyrimido [4,5-b] pyrazyl-6-methyl)-N-methylamino] benzoic acid is isolated by filtration.

Example XV

4-[N-(2,4-dihydroxypyrimido[4,5-b] pyrazyl-6-methyl)-N-methylamino] benzoic acid is prepared as described above except that 14.2 grams 2,4-dihydroxy-5,6-diaminopyrimidine is used for the diaminopyrimidine.

Example XVI

4 - [N - (2-methylpyrimido[4,5-b] pyrazyl-6-methyl)-N-methylamino] benzoic acid is prepared as described above except that 12.4 grams 2-methyl-5,6-diaminopyrimidine is used for the diaminopyrimidine.

Example XVII

4 - [N-(4-methylpyrimido[4,5-b] pyrazyl-6-methyl)-N-methylamino] benzoic acid is prepared as described above except that 12.4 grams 4-methyl-5,6-diaminopyrimidine is used for the diaminopyrimidine.

Example XVIII

4 - [(pyrimido[4,5 - b] pyrazyl-6-methyl)-N-methylamino] benzoic acid is prepared as described above except the 11.0 grams 4,5-diaminopyrimidine is used.

Example XIX

A mixture of 25.7 grams 2,4,5-triamino-6-hydroxypyrimidine sulfate monohydrate, 24.4 grams barium chloride dihydrate, and 700 cc. water are heated to 60° C. for 10 minutes. After cooling to 40° C. 15 grams p-methylaminobenzoic acid is added and the mixture adjusted to pH 3–4. Simultaneously and at 40° C. solutions of 21.6 grams of 2,3-dibromopropionaldehyde in acetic acid and sodium hydroxide to maintain pH 3–4 are added. The mixture is cooled after the reaction is completed and the 4-[N-(2-amino - 4 - hydroxypyrimido[4,5-b] pyrazyl-6-methyl)-N-methylamino]benzoic acid is collected on the filter, washed with water and dried.

Example XX

A slurry of 26 grams 2,4,5,6-tetraaminopyrimidine dihydrate sulfate, 24 grams barium chloride dihydrate, and 32 grams disodium p-methylaminobenzoylglutamic acid in 700 cc. water is heated at 60° C. for 10 minutes, cooled to 40° C. and adjusted to pH 3–4. Then over a 20 minute period are added simultaneously 21.6 grams dibromopropionaldehyde in 21.6 grams acetic acid, 12.5 grams iodine and 25 grams potassium iodide in 80 cc. water, and 5 N sodium hydroxide to maintain pH 3–4. After stirring 10 minutes more and cooling to 20° C., the crude 4-[N - (2,4 - diaminopyrimido[4,5-b] pyrazyl-6-methyl)-N-methylamino] benzoylglutamic acid is isolated by filtration and is an antagonist to pteroylglutamic acid.

The crude is purified as in Example XIII.

Example XXI

4-[N-(4-methylpyrimido [4,5-b] pyrazyl-6-methyl)-N-methylamino] benzoylglutamic acid is prepared as described above except that 12.4 grams 4-methyl-5,6-diaminopyrimidine is used for the diaminopyrimidine.

We claim:

1. Compounds having the general formula

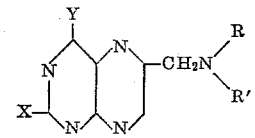

in which X and Y are members of the group consisting of hydrogen, hydroxy, sulfhydryl, alkyl, halo, and amino radicals; R is a radical of the group consisting of alkyl and substituted alkyl radicals, and R' is a monocyclic aromatic radical of the benzene series.

2. Compounds having the general formula

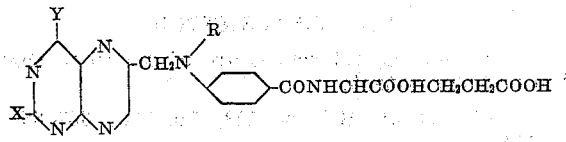

in which X and Y are members of the group consisting of hydrogen, hydroxy, sulfhydryl, alkyl, halo, and amino radicals and R is a radical of the group consisting of alkyl and substituted alkyl radicals.

3. Compounds having the general formula

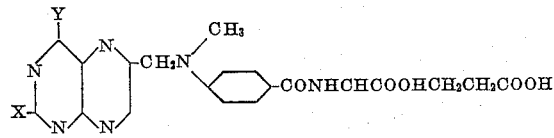

in which X and Y are members of the group consisting of hydrogen, hydroxy, sulfhydryl, alkyl, halo, and amino radicals.

4. Compounds having the general formula

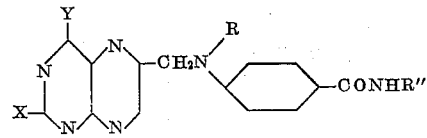

in which X and Y are members of the group consisting of hydrogen, hydroxy, sulfhydryl, alkyl, halo, and amino radicals, R is a radical of the group consisting of alkyl and substituted alkyl radicals, and —NHR'' is the radical of an amino acid.

5. Compounds having the general formula

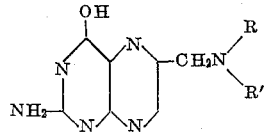

in which R is a radical of the group consisting of alkyl and substituted alkyl radicals, and R' is a monocyclic aromatic radical of the benzene series.

6. Compounds having the general formula

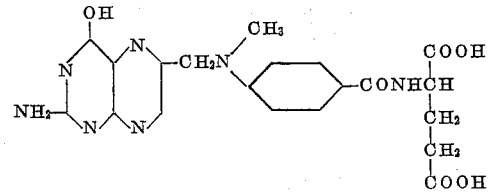

7. Compounds having the general formula

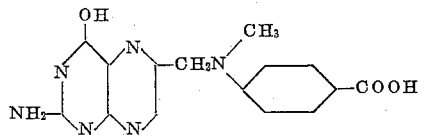

8. A method of preparing compounds having the general formula

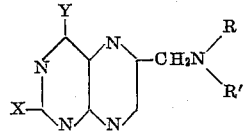

in which X and Y are members of the group consisting of hydrogen, hydroxy, sulfhydryl, alkyl, halo, and amino radicals, R is a radical of the group consisting of alkyl and substituted alkyl radicals, and R' is a monocyclic aromatic radical of the benzene series, which comprises the steps of mixing together under reactive conditions a 2,6-disubstituted-4,5-diaminopyrimidine, an alpha, beta-dihalopropionaldehyde, and a secondary amine, and after reaction thereof recovering the said product.

9. A method of preparing compounds having the general formula

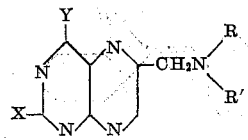

in which X and Y are members of the group consisting of hydrogen, hydroxy, sulfhydryl, alkyl, halo, and amino radicals, R is a radical of the group consisting of alkyl and substituted alkyl radicals, and R' is a monocyclic aromatic radical of the benzene series, which comprises the steps of mixing together under reactive conditions a 2,6-disubstituted-4,5-diaminopyrimidine, an alpha, beta-dichloropropionaldehyde, and a secondary amine, and after reaction thereof recovering the said product.

10. A method of preparing compounds having the general formula

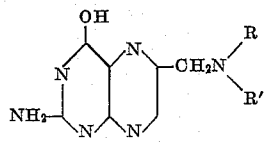

in which R is a radical of the group consisting of alkyl and substituted alkyl radicals, and R' is a monocyclic aromatic radical of the benzene series, which comprises mixing together under reactive conditions 2,4,5-triamino-6-hydroxypyrimidine, a dihalopropionaldehyde, and a secondary amine and after reaction thereof recovering the said product.

11. A process which comprises mixing together under reactive conditions 2,4,5-triamino-6-hydroxypyrimidine, a dihalopropionaldehyde, and p-methylaminobenzoylglutamic acid.

12. A method of preparing compounds having the general formula

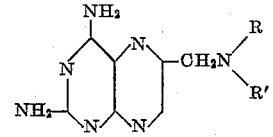

in which R is a radical of the group consisting of alkyl and substituted alkyl radicals, and R' is a monocyclic aromatic radical of the benzene series, which comprises mixing together under reactive conditions 2,4,5,6-tetraaminopyrimidine, a dihalopropionaldehyde, and a secondary amine and after reaction thereof recovering the said product.

13. A method of preparing compounds having the general formula

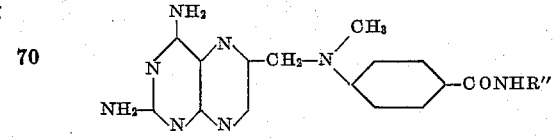

in which NHR'' is the radical of an amino acid, and after reaction thereof recovering the said product, which comprises mixing together under reactive conditions 2,4,5,6-tetraaminopyrimidine, a dihalopropionaldehyde, and a secondary amine having the formula

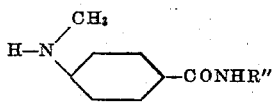

in which NHR" is the radical of an amino acid, and after reaction thereof recovering the said product.

14. Compounds having the general formula

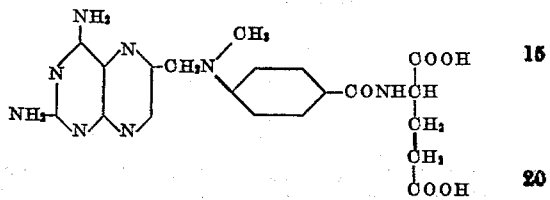

15. A process which comprises mixing together under reactive conditions 2,4,5,6-tetraaminopyrimidine, a dihalopropionaldehyde, and p-methylaminobenzoylglutamic acid.

JAMES M. SMITH, Jr.
DONNA B. COSULICH.

REFERENCES CITED

The following references are of record in the file of this patent:

Angier et al., Science 103, No. 2683 667–669 (1946).